May 19, 1931.  A. M. CAMPBELL  1,805,974
DISK PLOW
Filed Feb. 3, 1930  2 Sheets-Sheet 1
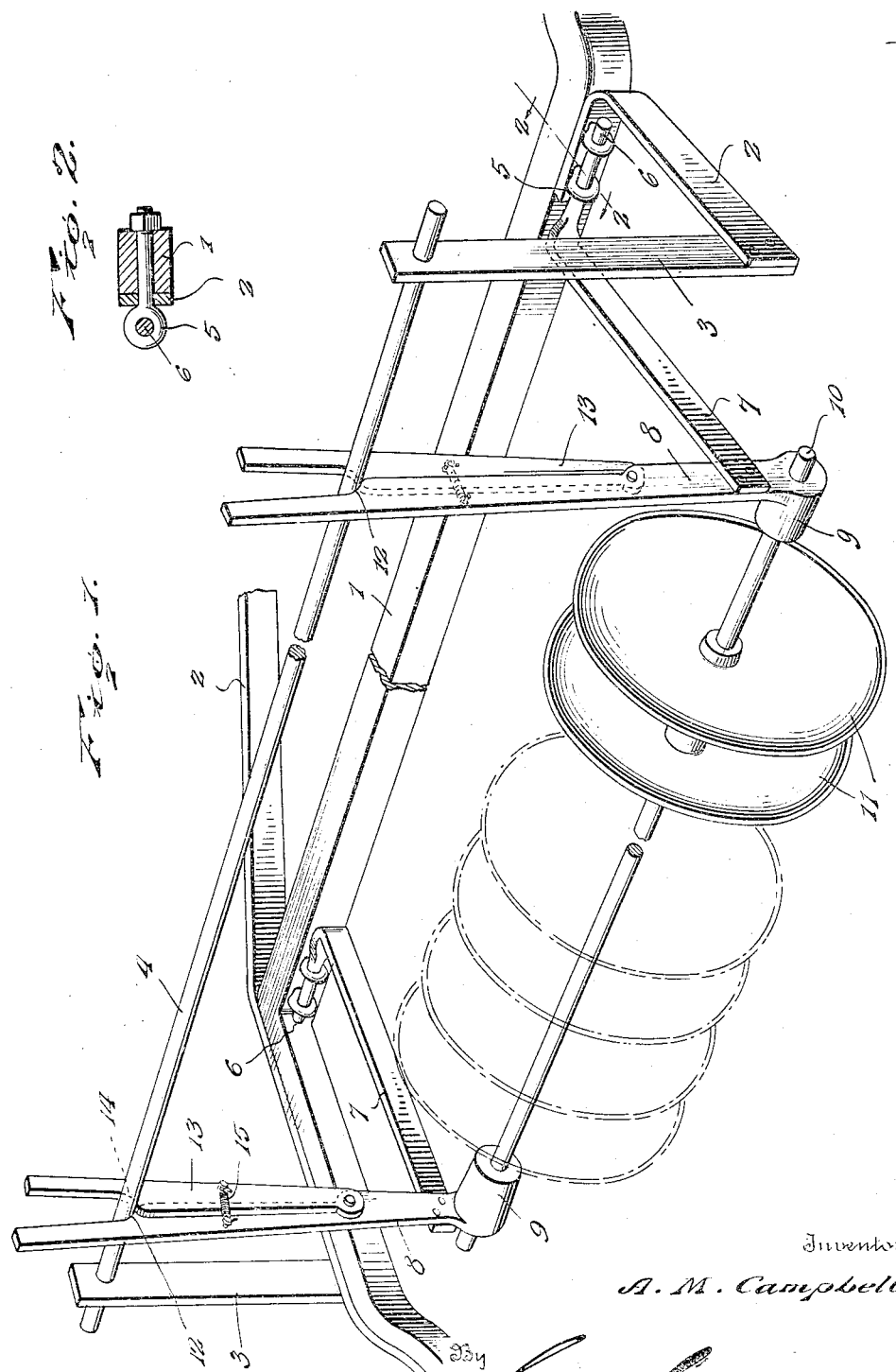
Inventor:
A. M. Campbell.
By Lacey & Lacey,
Attorneys May 19, 1931.  A. M. CAMPBELL  1,805,974
DISK PLOW
Filed Feb. 3, 1930  2 Sheets-Sheet 2
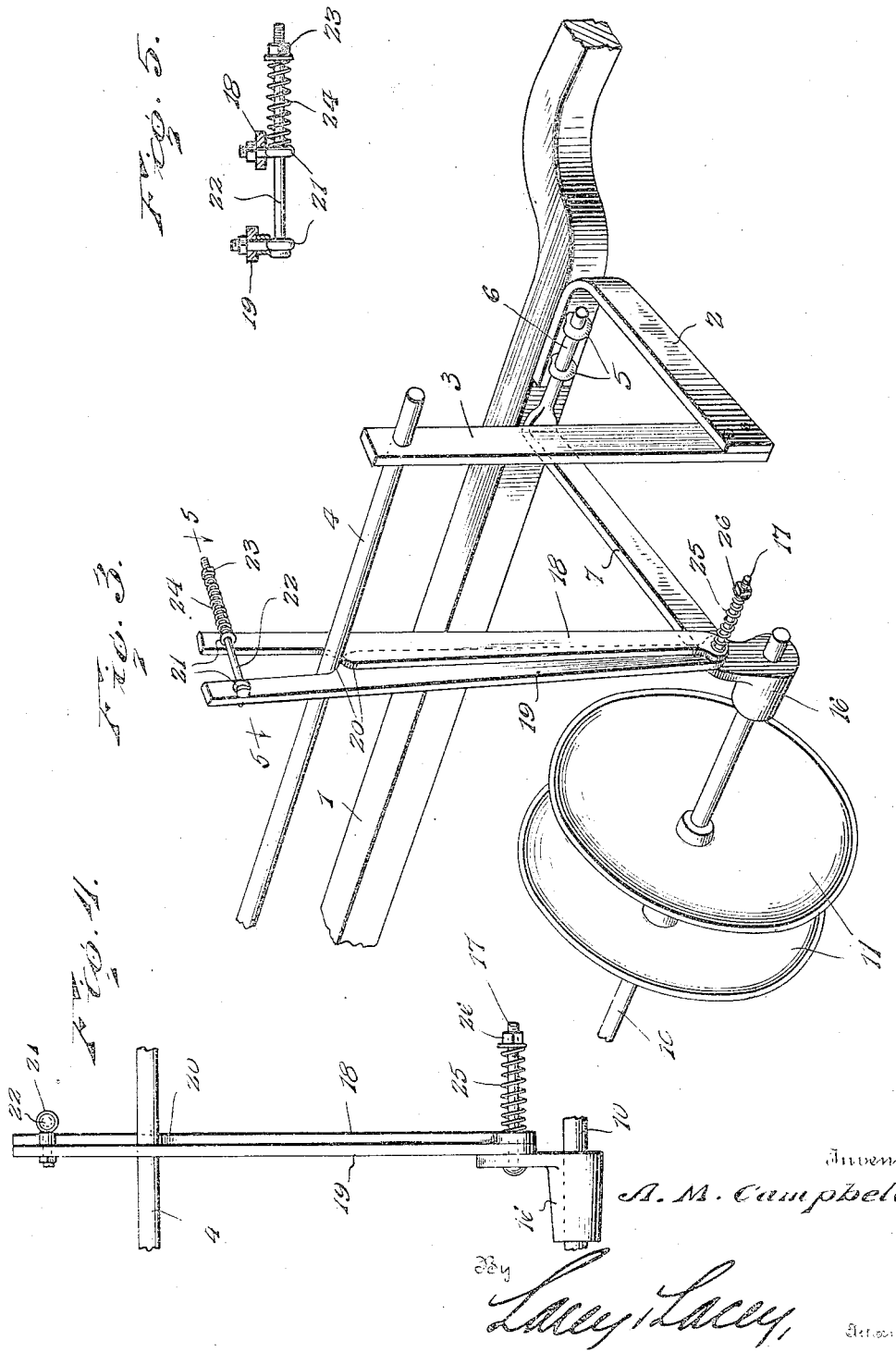
Inventor
A. M. Campbell.
By
Lacy & Lacy,
Attorneys Patented May 19, 1931

1,805,974

UNITED STATES PATENT OFFICE

ALEXANDER M. CAMPBELL, OF WINNIPEG, MANITOBA, CANADA

DISK PLOW

Application filed February 3, 1930. Serial No. 425,611.

This invention has for its object the provision of simple and efficient means whereby the gang of disks in a disk plow or cultivator will be permitted to yield to large rocks or other immovable obstructions which may be encountered in the operation of the plow or cultivator while at the same time the weight of the frame of the machine will be imposed upon the disks so as to hold them effectually to their work under normal conditions. This stated object, and other objections which will incidentally appear in the course of the following description, are attained in such a mechanism as is illustrated in the accompanying drawings, and the invention resides in certain novel features which will be particularly pointed out in the appended claims.

In the drawings:

Figure 1 is a perspective view showing one embodiment of the invention, so much of a disk plow frame being shown as is necessary to an understanding of the invention.

Fig. 2 is a detail section on the line 2—2 of Fig. 1,

Fig. 3 is a view similar to Fig. 1 but showing a somewhat different embodiment of the invention, Fig. 4 is an elevation of the bearing post shown in Fig. 3, and Fig. 5 is a section on the line 5—5 of Fig. 3.

The reference numeral 1 indicates a cross beam of a disk plow frame to the ends of which beam are secured side bars 2. The side bars 2 may be of the usual construction and the frame may be equipped with the usual construction and the frame may be equipped with the usual furrow and landside wheels. Secured rigidly to the side bars and rising therefrom at the rear of the main cross beam 1 are standards or posts 3, in the upper ends of which is secured a transverse pressure bar 4. Adjacent the ends of the beam 1 are bearings 5, which are shown as eye bolts having their shanks extending through and secured in the beam and their eyes arranged to receive the lateral circular terminals 6 of gang-carrying arms 7. The bearings may be of other forms if desired, the essential requirement being that they will firmly support the front ends of the arms 7 and will permit a pivotal movement of the arms in the bearings, and the arm 2 at the right side of the frame is shown as an angular bracket having its front end engaged with and secured by the eye bolts. To the rear ends of the carrying arms 7 are secured bearing posts 8, the lower ends of which, as shown in Fig. 1, are formed integral with or rigidly secured to the bearings 9 in which the axle 10 of the disk gang is fitted, the disks 11 of the usual form being mounted upon the axle and spaced apart in the usual manner. It may be noted at this point that, while the drawings illustrate only a single gang of disks, it must be understood that in actual practice the disks are generally arranged in two gangs and a pair of bearing arms is provided for each gang, the bearing arms being disposed at the ends of the gang. As clearly shown in the drawings, the bearing posts 8 extend upwardly past the pressure bar 4 and, in the form shown in Fig. 1, are each constructed on its front edge with a shoulder 12 engaging under the bar and normally aiding in supporting the same. Pivoted to each post 8 above the respective arm 7 is a leg or holding member 13 which extends upwardly past the pressure bar 4 but at the opposite side of said bar from the respective post, and this holding member is formed with a shoulder 14 which also engages under the bar, the upper ends of the holding member and the post forming a crotch in which the pressure bar 4 seats. The holding member is normally held to the respective post by a retractile spring 15 of sufficient strength to maintain the shoulders 12 and 14 in engagement with the under side of the bar 4 under normal conditions. Should the disks strike a rock or large stone or other immovable obstruction, the increased pulling strain will eventually overcome the tension of the spring 15, whereupon the holding member 13 will move from the post 8 and the post and the holding member then ride upwardly past the bar 4 so that the gang of disks may ride over the obstruction. It will be noted that the shoulders 12 and 14 are somewhat beveled or inclined so that when the abnormal strain is imposed upon the gang of disks the separation of the posts and the respective holding members will be easily accomplished and the upward movement of the same permitted. At the same time, however, the springs 15 hold these shoulders close together below the bar 4 so that the weight of the frame of the machine and said bar is transmitted through the posts and the holding arms to hold the disks to the ground and cause them to penetrate the soil to the desired degree. The device is very simple and may be very readily applied to any disk plow or cultivator at slight expense while in use it will be found highly efficient for the purpose for which it is designed.

In the form shown in Fig. 3, the bearing 16 for the axle 10 is united with the carrying arm 7 and at the junction of the bearing and the arm a supporting fulcrum bolt 17 is fitted transversely therethrough and projects from one side thereof. The pressure post or standard consists of two similar members 18, 19, having their lower ends pivotally engaged around the bolt 17 at one side of the arm and bearing, said members being provided on their opposed edges with mating shoulders 20 to engage under the pressure bar 4 in the same manner as the shoulders 12, 14 in the first-described form engage thereunder. Above the shoulders 20, the members 18 and 19 are equipped with eyes 21 through which is fitted a bolt or headed pin 22 having its head bearing against the outer side of one of the eyes and having a nut 23 fitted on its threaded end and forming an adjustable abutment for an expansion spring 24 which is fitted around the bolt between the nut and the adjacent eye 21. It will be seen at once that the strength of the spring is exerted to hold the members of the post or prop together but it will yield readily under abnormal strain to permit opening and upward movement of the post.

The head of the fulcrum bolt 17 rests against the side of the arm 7 and an expansion spring 25 is coiled around the bolt between a nut 26 thereon and the side of the prop or pressure post so that the arm 7 and the post will be held together. Should one end of the gang of plows strike an immovable obstruction while the other end thereof is on or in tillable soil, the described mounting will permit the gang to rock so that one end will remain at work while the opposite end will ride over and clear the obstruction.

Having thus described the invention, I claim:

1. Means for the purpose set forth comprising in combination with a frame gang-carrying arms, means for pivotally mounting said arms upon the frame, posts rising from said arms, and means whereby said posts will yieldably engage the under side of a fixed member of the frame whereby normally the weight of the frame will be transmitted to the disks and under abnormal strain the disks may be permitted to rise relative to the frame.

2. The combination with the frame of an agricultural implement, of arms pivotally mounted upon the frame, posts secured to said arms and rising therefrom, bearings at the rear ends of said arms carrying a gang of disks, said posts having shoulders formed on their edges above the gang-carrying arms, holding members pivotally mounted upon the respective posts and provided with shoulders mating with the shoulders on the posts, means for yieldably holding the holding members to the posts, and a pressure bar fixed to the frame of the machine and seating on said shoulders whereby the weight of the machine frame will be transmitted to the gang of disks and the disks may be permitted to yield to an obstruction.

3. Means for the purpose set forth comprising gang-carrying arms, means for pivotally mounting said arms, a pressure bar fixed above the gang-carrying arms, pivotally connected members carried by said arms and bearing against the under side of said pressure bar, and means for yieldably holding said members to said bar.

4. The combination with the frame of an agricultural implement, of gang-carrying arms pivotally mounted thereon, a pressure bar fixed on the frame above said arms, pivotally connected members rising from the arms and having mating shoulders engaging under said bar, and a spring on the sides of said members yieldably holding the shoulders under the bar.

5. The combination with the frame of an agricultural implement, of gang-carrying arms pivotally mounted thereon, a pressure bar fixed on the frame above said arms, pressure-transmitting members engaging under said bar and releasable therefrom under abnormal strain, and means for flexibly mounting said members on the gang-carrying arms whereby the ends of the gang may rock independently.

In testimony whereof I affix my signature.

ALEXANDER M. CAMPBELL. [L. S.]